No. 842,069. PATENTED JAN. 22, 1907.
J. C. BRENNAN.
DRIVE WHEEL FOR AUTOMOBILES.
APPLICATION FILED JULY 19, 1906.
Fig. 1.
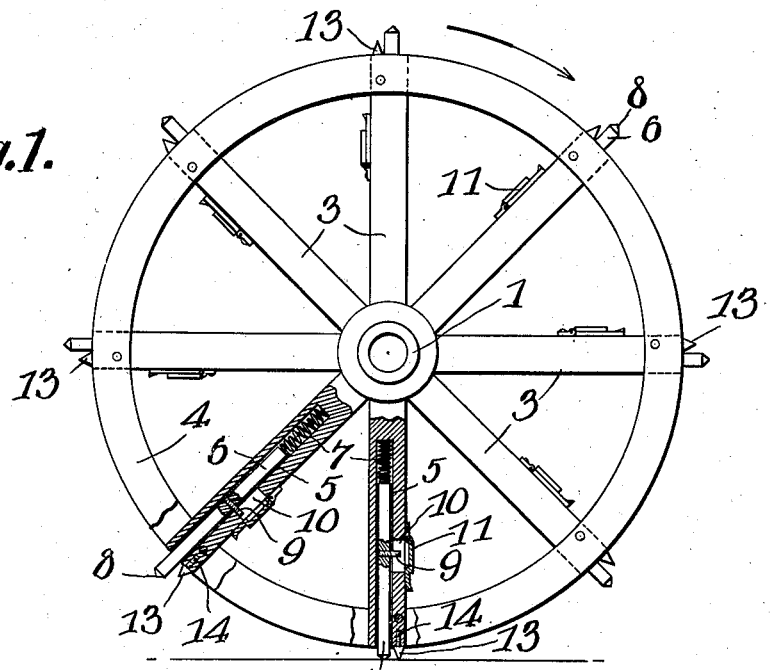
Fig. 2.
Fig. 3.
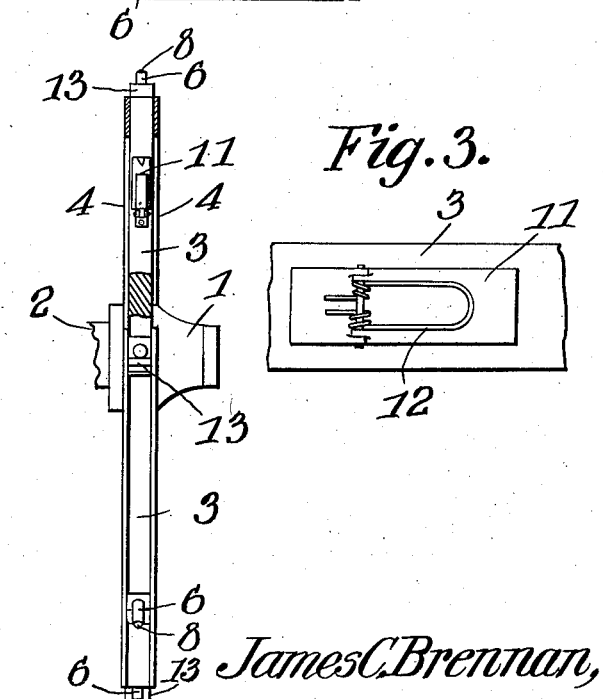
James C. Brennan,
INVENTOR.
WITNESSES:
E. F. Stewart
C. Bradway.
By C. A. Snow & Co.
ATTORNEYS

UNITED STATES PATENT OFFICE.

JAMES C. BRENNAN, OF POWERS, MICHIGAN.

DRIVE-WHEEL FOR AUTOMOBILES.

No. 842,069. Specification of Letters Patent. Patented Jan. 22, 1907.

Application filed July 19, 1906. Serial No. 326,899.

*To all whom it may concern:*

Be it known that I, JAMES C. BRENNAN, a citizen of the United States, residing at Powers, in the county of Menominee and State of Michigan, have invented a new and useful Drive-Wheel for Automobiles, of which the following is a specification.

This invention relates to driving-wheels for automobiles designed for use in connection with runners or bobs for winter operation when the streets or roads are covered with snow and ice.

The invention has for one of its objects to provide a wheel of simple inexpensive construction and so designed as to produce a maximum tractive effect.

A further object of the invention is the provision of a plurality of cushioned spurs or surface-engaging members mounted in the spokes of the wheel and normally extending beyond the felly thereof, so as to bite into the ice and prevent the wheel from slipping.

With these objects in view and others, as will appear as the nature of the invention is better understood, the invention comprises the various novel features of construction and arrangement of parts, which will be more fully described hereinafter and set forth with particularity in the appended claims.

In the accompanying drawings, which illustrate one of the embodiments of the invention, Figure 1 is a side elevation of a driving-wheel, showing part of the felly broken away and one of the spokes in section. Fig. 2 is an end view with portions broken away. Fig. 3 is an enlarged detail view.

Corresponding parts in the several figures are indicated throughout by similar characters of reference.

In practice two driving-wheels constructed in accordance with the principles of the present invention are adapted to be used on the rear driving-axle of an automobile in place of the usual rubber-tired driving-wheels. The front wheels are also removed, and bobs or runners of any approved construction are mounted on the stub-axles in any desired manner, the steering of the vehicle being accomplished by the usual steering-gear, as will be readily understood. In connection with the driving-wheel the rear runners or bobs are also employed, the weight of the vehicle being taken mostly by the rear runners rather than by the driving-wheels.

Each driving-wheel comprises a hub 1, which may be of any approved construction and is keyed to the driving-axle shown in part at 2. Radiating from the hub are spokes 3, to the outer ends of which are bolted or otherwise secured the rings 4. The rings are located on the opposite sides of the spokes and are spaced apart by the latter. They are preferably made in one piece, although, if desired, they may be made up of segments. Each spoke is provided with an inwardly-extending bore 5, through the open outer end of which projects a rod 6. Between the inner end of each rod and the inner wall of its respective bore is a helical compression-spring 7, which normally maintains the rod extended. The outer end of the rod extends about an inch and a half or two inches beyond the rings 4, constituting the felly of the wheel, and is pointed or otherwise shaped, as at 8, to form a spur or surface-engaging member. The springs 7 serve to cushion the rod 6, so that as the weight of the vehicle is transferred from one spur or surface-engaging member to another unpleasant shocks will not be produced. In order to hold the rods 6 in their operative position, retaining devices are employed. These each comprise a stop 9, preferably in the form of a screw, so as to be removable, that is secured in the rod and is movable in a slot 10 of the spoke. The stop is adapted to engage the outer end of the slot when the weight of the vehicle is not brought to bear on the rod and to move toward the inner end of the slot when the weight is supported by the rod. The slots 10 of the spokes open outwardly from the rod-containing bores, and the outer ends of the slots are covered by hinged covers 11. These covers are each provided with a spring 12 for maintaining them normally closed. When it is desired to renew a rod or a compression-spring, the stop 9 is first taken out, so as to permit the rod thereof to be readily removed and a new one inserted. The covers 11 obviously prevent the entrance of dirt to the bore.

Arranged to coöperate with the cushion-surface-engaging members are fixed teeth or projections 13. These are arranged one on the outer end of each spoke and are preferably in the form of a wedge, with the edge thereof disposed transversely to the plane of the wheel, so as to sink into the surface of the road and produce a strong tractive effect in combination with the spurs or surface-engaging members 8. The wedge-shaped teeth or projections 13 are about a third of the height of the spurs 8, so that they are brought into operation only after the cushioned rods are pressed inwardly by the weight of the vehicle. The teeth are each provided with a central shank or stud 14, which may be threaded, so as to be screwed into a tapped opening in the end of the spoke. Obviously any other means may be employed for securing the teeth to the spokes.

From the foregoing description, taken in connection with the accompanying drawings, the advantages of the construction and of the method of operation will be readily appreciated by those skilled in the art to which the invention appertains. It will be seen that while the cushioned spurs or surface-engaging members assist in preventing the wheels from slipping around on the road the wedge-shaped teeth are also instrumental to this end and insure a high tractive effort.

I have described the principle of operation of the invention, together with the apparatus which I now consider to be the best embodiment thereof; but I desire to have it understood that the apparatus shown is merely illustrative and that various changes may be made when desired as are within the scope of the invention.

What is claimed is—

1. A wheel comprising a hub, spokes provided with longitudinally-extending bores, felly-rings extending along the opposite sides of the spokes, cushioned surface-engaging members arranged in the bores of the spokes, and fixed surface-engaging members disposed on the outer ends of the spokes and adjacent to the cushioned surface-engaging members.

2. A wheel comprising a hub, spokes provided with longitudinally-extending bores and transversely-extending slots communicating with the bores, cushioned surface-engaging members in the bores, stops connected with the members and disposed in the slots to engage the end walls of the latter, and a spring-closed cover on each of the spokes to cover the slot thereof.

3. A wheel comprising a hub, spokes provided with longitudinally-extending bores, felly-rings connected with the spokes, cushion surface-engaging members in the bores of the spokes arranged with their outer ends located between and projecting beyond the felly-rings, and wedge-shaped surface-engaging members arranged in fixed relation on the outer ends of the spokes and between the felly-rings.

In testimony that I claim the foregoing as my own I have hereto affixed my signature in the presence of two witnesses.

JAMES C. BRENNAN.

Witnesses:
GEO. H. LAWRENCE,
CHAS. D. SYMONDS.